(12) United States Patent
Furumoto

(10) Patent No.: US 9,423,016 B2
(45) Date of Patent: Aug. 23, 2016

(54) HYDRAULIC OIL DETERIORATION RATIO ESTIMATING APPARATUS IN VEHICLE

(71) Applicant: HONDA MOTOR CO., LTD., Tokyo (JP)

(72) Inventor: Mitsumasa Furumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/590,995

(22) Filed: Jan. 7, 2015

(65) Prior Publication Data

US 2015/0198233 A1 Jul. 16, 2015

(30) Foreign Application Priority Data

Jan. 14, 2014 (JP) .................. 2014-004683

(51) Int. Cl.
*F16H 57/04* (2010.01)

(52) U.S. Cl.
CPC .................... *F16H 57/0405* (2013.01)

(58) Field of Classification Search
None
See application file for complete search history.

(56) References Cited

U.S. PATENT DOCUMENTS

| 7,433,770 | B2 | 10/2008 | Inagawa et al. | |
|---|---|---|---|---|
| 8,050,814 | B2 * | 11/2011 | Rains | F16H 57/04 340/457.4 |
| 8,676,436 | B2 * | 3/2014 | Raimarckers | F01D 21/003 701/29.5 |
| 8,710,973 | B2 * | 4/2014 | Schneider | F01M 11/12 184/1.5 |
| 8,874,307 | B2 * | 10/2014 | Behr | F15B 19/005 701/103 |
| 2005/0131599 | A1 * | 6/2005 | Inagawa | F16H 57/0405 701/51 |

FOREIGN PATENT DOCUMENTS

| JP | 2005-172048 | 6/2005 |
|---|---|---|
| JP | 2006-322587 | 11/2006 |

* cited by examiner

*Primary Examiner* — John R Olszewski
*Assistant Examiner* — Jess Whittington
(74) *Attorney, Agent, or Firm* — Mori & Ward, LLP

(57) ABSTRACT

A hydraulic oil deterioration ratio estimating apparatus in a vehicle includes a torque converter, an automatic transmission, an oil temperature detector, an engine speed detector, an input shaft rotation speed detector, an output shaft rotation speed detector, and a hydraulic oil deterioration ratio estimator. The hydraulic oil deterioration ratio estimator is configured to estimate a deterioration ratio of hydraulic oil. The hydraulic oil deterioration ratio estimator includes a first thermal deterioration ratio calculator, a second thermal deterioration ratio calculator, a third thermal deterioration ratio calculator, a mechanical deterioration ratio calculator, and a deterioration ratio comparator. The first thermal deterioration ratio calculator is configured to calculate a first thermal deterioration ratio of the hydraulic oil during stoppage of the vehicle based on an estimated value of a change in temperature of the hydraulic oil from the stoppage of the vehicle to start of the vehicle.

9 Claims, 12 Drawing Sheets

HYDRAULIC OIL DETERIORATION RATIO ESTIMATING APPARATUS IN VEHICLE

CROSS-REFERENCE TO RELATED APPLICATIONS

The present application claims priority under 35 U.S.C. §119 to Japanese Patent Application No. 2014-004683, filed Jan. 14, 2014, entitled "Hydraulic Oil Deterioration Ratio Estimating Apparatus for Vehicle." The contents of this application are incorporated herein by reference in their entirety.

BACKGROUND

1. Field

The present disclosure relates to a hydraulic oil deterioration ratio estimating apparatus in a vehicle.

2. Description of the Related Art

In general, engine oil used for lubricating the engine of a vehicle and hydraulic oil (ATF) used for lubricating a transmission of the vehicle deteriorates over time. Accordingly, the oil needs to be changed. Japanese Unexamined Patent Application Publication Nos. 2005-172048 and 2006-322587 describe existing technology for determining a deterioration level of ATF.

According to Japanese Unexamined Patent Application Publication No. 2005-172048, deterioration of ATF is caused by the following two factors: the temperature of ATF and the rotation speed. Thus, deterioration of ATF is detected using thermal deterioration based on the fluid temperature and mechanical deterioration based on the rotation speed, and an alert message is output.

According to Japanese Unexamined Patent Application Publication No. 2005-172048, if a fuel temperature sensor and a rotation sensor malfunctions, deterioration is estimated using a value output from the sensor that malfunctions. Thus, a significant error between an estimated deterioration value and a real deterioration value occurs. For example, if the fuel temperature sensor outputs a value lower than a real temperature, it may be determined from the estimated value that ATF is not deteriorated. In contrast, if the fuel temperature sensor outputs a value higher than the real temperature, it may be determined from the sensor value that the deterioration level is significantly high.

To address such an issue, according to the technology of Japanese Unexamined Patent Application Publication No. 2006-322587, it is determined whether a fuel temperature detection unit malfunctions. If the fuel temperature detection unit malfunctions, an alternative value of the fuel temperature is set, and a thermal deterioration ratio at a time of malfunction is calculated. Thus, the thermal deterioration ratio is accurately estimated. In addition, the alternative value is set to a value that is higher than the ATF temperature during normal running conditions of the vehicle by a predetermined value. Thus, the deterioration level is estimated in a fail-safe manner. Furthermore, malfunction of an engine speed detection unit, an input shaft rotation speed detection unit, and an output shaft rotation speed detection unit is detected. If malfunction of one of the detection units is detected, a mechanical ATF deterioration ratio is calculated by using an alternative value. In this manner, the ATF deterioration ratio is accurately estimated.

SUMMARY

According to one aspect of the present invention, a hydraulic oil deterioration ratio estimating apparatus for use in a vehicle includes a torque converter, an automatic transmission, an oil temperature detector, an engine speed detecting unit, an input shaft rotation speed detector, an output shaft rotation speed detector, and a hydraulic oil deterioration ratio estimating unit. The torque converter is configured to transfer a drive force of an engine to an input shaft using hydraulic oil. The automatic transmission is configured to change a rotation speed of the input shaft rotated by the drive force through hydraulic control using the hydraulic oil and output the rotation to an output shaft. The oil temperature detector is configured to detect a temperature of the hydraulic oil. The engine speed detecting unit is configured to detect an engine speed of the engine. The input shaft rotation speed detector is configured to detect a rotation speed of the input shaft of the automatic transmission. The output shaft rotation speed detector is configured to detect a rotation speed of the output shaft of the automatic transmission. The hydraulic oil deterioration ratio estimating unit is configured to estimate a deterioration ratio of the hydraulic oil. The hydraulic oil deterioration ratio estimating unit includes a first thermal deterioration ratio calculating unit configured to calculate a thermal deterioration ratio of the hydraulic oil during stoppage of the vehicle on the basis of an estimated value of a change in temperature of the hydraulic oil from stoppage of the vehicle to start of the vehicle, a second thermal deterioration ratio calculating unit configured to calculate the current thermal deterioration ratio of the hydraulic oil on the basis of the temperature of the hydraulic oil detected by the oil temperature detector, add the calculated thermal deterioration ratio to a previously calculated thermal deterioration ratio, and calculate the thermal deterioration ratio after the vehicle starts operating, a third thermal deterioration ratio calculating unit configured to calculate the current thermal deterioration ratio of the hydraulic oil by summing the thermal deterioration ratio during stoppage of the vehicle calculated by the first thermal deterioration ratio calculating unit and the thermal deterioration ratio after the vehicle starts operating calculated by the second thermal deterioration ratio calculating unit, a mechanical deterioration ratio calculating unit configured to calculate a shear rotation speed of the hydraulic oil from the engine speed detected by the engine speed detecting unit, the rotation speed of the input shaft detected by the input shaft rotation speed detector, and the rotation speed of the output shaft detected by the output shaft rotation speed detector, calculate the current mechanical deterioration ratio of the hydraulic oil on the basis of the calculated shear rotation speed, and add the mechanical deterioration ratio to a previously calculated mechanical deterioration ratio, and a deterioration ratio comparing unit configured to compare the current thermal deterioration ratio calculated by the third thermal deterioration ratio calculating unit with the mechanical deterioration ratio calculated by the mechanical deterioration ratio calculating unit and select a larger one of the current thermal deterioration ratio and the mechanical deterioration ratio as an estimated value of the deterioration ratio of the hydraulic oil.

According to another aspect of the present invention, a hydraulic oil deterioration ratio estimating apparatus in a vehicle includes a torque converter, an automatic transmission, an oil temperature detector, an engine speed detector, an input shaft rotation speed detector, an output shaft rotation speed detector, and a hydraulic oil deterioration ratio estimator. The torque converter is configured to transfer a drive force of an engine to an input shaft using hydraulic oil. The automatic transmission is configured to change a rotation speed of the input shaft rotated by the drive force through hydraulic control using the hydraulic oil and configured to output a rotation to an output shaft. The oil temperature detector is configured to detect a temperature of the hydraulic oil. The engine speed detector is configured to detect an engine speed of the engine. The input shaft rotation speed detector is configured to detect the rotation speed of the input shaft of the automatic transmission. The output shaft rotation speed detector is configured to detect a rotation speed of the output shaft of the automatic transmission. The hydraulic oil deterioration ratio estimator is configured to estimate a deterioration ratio of the hydraulic oil. The hydraulic oil deterioration ratio estimator includes a first thermal deterioration ratio calculator, a second thermal deterioration ratio calculator, a third thermal deterioration ratio calculator, a mechanical deterioration ratio calculator, and a deterioration ratio comparator. The first thermal deterioration ratio calculator is configured to calculate a first thermal deterioration ratio of the hydraulic oil during stoppage of the vehicle based on an estimated value of a change in temperature of the hydraulic oil from the stoppage of the vehicle to start of the vehicle. The second thermal deterioration ratio calculator is configured to calculate a first current thermal deterioration ratio of the hydraulic oil based on the temperature of the hydraulic oil detected by the oil temperature detector and configured to add the first current thermal deterioration ratio to an integrated value of the first current thermal deterioration ratio to calculate a second thermal deterioration ratio of the hydraulic oil after the vehicle starts operating. The third thermal deterioration ratio calculator is configured to sum the first thermal deterioration ratio during the stoppage of the vehicle calculated by the first thermal deterioration ratio calculator and the second thermal deterioration ratio after the vehicle starts operating calculated by the second thermal deterioration ratio calculator to calculate a second current thermal deterioration ratio of the hydraulic oil. The mechanical deterioration ratio calculator is configured to calculate a shear rotation speed of the hydraulic oil from the engine speed detected by the engine speed detector, the rotation speed of the input shaft detected by the input shaft rotation speed detector, and the rotation speed of the output shaft detected by the output shaft rotation speed detector, configured to calculate a current mechanical deterioration ratio of the hydraulic oil based on the shear rotation speed, and configured to add the current mechanical deterioration ratio to an integrated value of the current mechanical deterioration ratio to calculate a mechanical deterioration ratio of the hydraulic oil. The deterioration ratio comparator is configured to compare the second current thermal deterioration ratio calculated by the third thermal deterioration ratio calculator with the mechanical deterioration ratio calculated by the mechanical deterioration ratio calculator to select a larger one of the second current thermal deterioration ratio and the mechanical deterioration ratio as an estimated value of the deterioration ratio of the hydraulic oil.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 illustrates a thermal deterioration acceleration coefficient table after IG-ON.

FIG. 5 illustrates a thermal deterioration ratio table after IG-ON.

FIG. 9 is a flowchart of calculation of thermal ATF deterioration after IG-ON.

DESCRIPTION OF THE EMBODIMENTS

Figure 1:
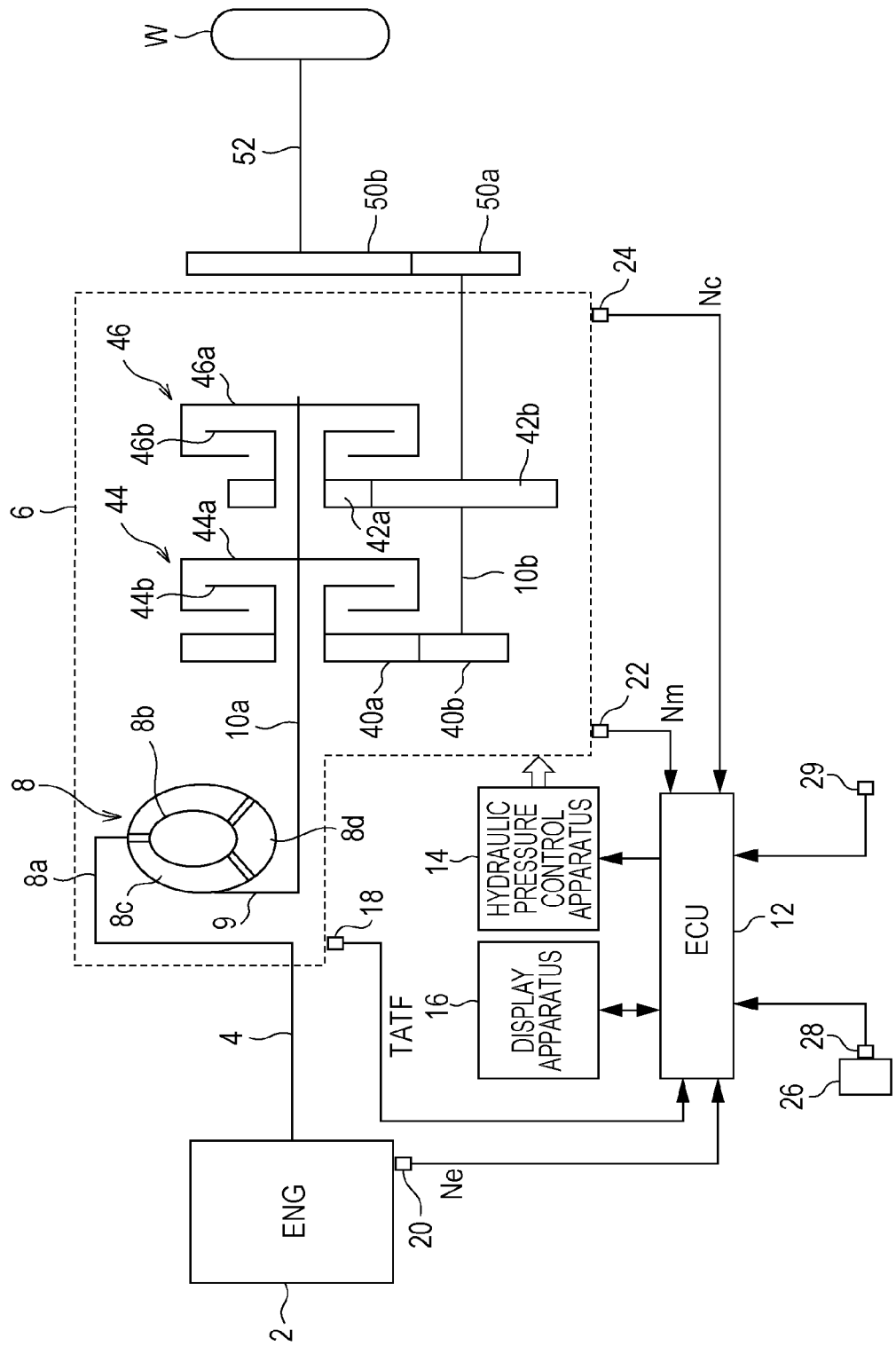
FIG. 1 is a schematic illustration of the configuration of a vehicle having an ATF deterioration estimating apparatus mounted therein according to an exemplary embodiment of the present disclosure.

The embodiments will now be described with reference to the accompanying drawings, wherein like reference numerals designate corresponding or identical elements throughout the various drawings.

Exemplary embodiments of the present disclosure are described in detail below with reference to the accompanying drawings. FIG. 1 is a schematic illustration of the configuration of a vehicle having an ATF deterioration estimating apparatus mounted therein according to an exemplary embodiment of the present disclosure. As illustrated in FIG. 1, the vehicle includes an engine 2, a crankshaft 4, an automatic transmission (also simply referred to as a "transmission") 6, an ECU (a control unit) 12, a hydraulic pressure control unit 14, a display apparatus 16, a fuel temperature sensor 18, an engine rotation speed sensor 20, a main shaft rotation speed sensor 22, and a counter shaft rotation speed sensor 24.

The crankshaft 4 of the engine 2 is connected to the transmission 6. A torque converter (T/C) 8 disposed in the transmission 6 transfers the engine torque via ATF (hydraulic oil) which is in the form of fluid. The T/C 8 includes a pump impeller 8b integrated with a front cover 8a connected to the crankshaft 4, a turbine runner 8c that is disposed between the front cover 8a and the pump impeller 8b and that faces the pump impeller 8b, and a stator 8d.

A lockup clutch 9 is disposed between the turbine runner 8c and the front cover 8a. The lockup clutch 9 is pressed against the inner surface of the front cover 8a under the control of the hydraulic pressure control unit 14 in response to an instruction output from the ECU 12. Thus, the lockup clutch 9 is engaged with the front cover 8a. In contrast, if the lockup clutch 9 is unpressed, the lockup clutch 9 is disengaged from the front cover 8a. ATF is enclosed within a container formed by the front cover 8a and the pump impeller 8b.

The transmission 6 further includes a main shaft 10a, a counter shaft 10b disposed parallel to the main shaft 10a, and a plurality of pairs of gears, one of which is provided on the main shaft 10a side and the other on the counter shaft 10b side (e.g., first to fifth forward gear pairs and a reverse gear pair).

The plurality of gear pairs are formed from input gears attached to the main shaft 10a and output gears attached to the counter shaft 10b. The gears in each pair are engaged with each other at all times.

Either the input gear or the output gear is freely rotatable relative to the main shaft 10a or the counter shaft 10b. The gear is connected and disconnected to and from the main shaft 10a or the counter shaft 10b using a synchro clutch.

Among the plurality of gear pairs, a high speed gear (e.g., 4th gear) and a low speed gear (e.g., 1st gear) of the forward gear pairs are illustrated in FIG. 1 as examples. A high speed output gear 40b of the high speed gear pair and a low speed output gear 42b of the low speed gear pair are joined to the counter shaft 10b in an integrated manner.

A high speed input gear 40a of the high speed gear pair and a low speed input gear 42a of the low speed gear pair are idle gears that are rotatable about the main shaft 10a. The high speed input gear 40a and the low speed input gear 42a are connected and disconnected to and from the main shaft 10a by synchro clutches 44 and 46, respectively.

Each of the synchro clutches 44 and 46 is formed as, for example, a wet multi-disc clutch. The synchro clutches 44 and 46 include, respectively, outer clutch plates 44a and 46a disposed so as to be rotatable in unison with the main shaft 10a, inner clutch plates 44b and 46b that are disposed so as to be overlapped by the outer clutch plates 44a and 46a, be in contact with the outer clutch plates 44a and 46a, and be rotatable in unison with the input gears 40a and 42a, and hydraulic actuators (not illustrated) controlled by the ECU 12. Note that the input gears 40a and 42a are idle gears for the main shaft 10a.

Each of the hydraulic actuators has a piston that forms a piston chamber and that is disposed slidably. The hydraulic actuator generates a thrust force in accordance with the hydraulic pressure of ATF supplied to the piston chamber. Thus, the hydraulic actuator engages the outer clutch plate 44a with the inner clutch plate 44b or engages the outer clutch plate 46a with the inner clutch plate 46b. In this manner, the counter shaft 10b is engaged with one of the input gears 40a and 42a in an integrated manner. The hydraulic pressure of ATF supplied to the piston chamber is controlled on the basis of a clutch hydraulic pressure instruction value output from the ECU 12. Thus, the engagement state of each of the synchro clutches 44 and 46 can be controlled.

An output final gear 50a that is disposed so as to be integrated with the counter shaft 10b of the transmission 6 and a drive final gear 50b that is disposed so as to be integrated with a drive shaft 52 connected to a drive wheel W form a final gear pair. The output final gear 50a are engaged with the drive final gear 50b at all times.

The ECU 12 controls the hydraulic pressure of ATF for each of the lockup clutch 9 and the synchro clutches 44 and 46 using the hydraulic pressure control unit 14. In addition, the ECU 12 controls a display operation performed by the display apparatus 16 and the operation performed on the display apparatus 16. Furthermore, the ECU 12 performs ATF deterioration estimation and ATF deterioration ratio resetting, which are described in more detail below. The hydraulic pressure control unit 14 controls the clutch torque of each of the lockup clutch 9 and the synchro clutches 44 and 46 of the transmission 6 on the basis of an ATF hydraulic pressure instruction output from the ECU 12.

The display apparatus 16 includes a display unit that displays information regarding a distance traveled, a running speed, a time, an oil change alert message, and the oil change count. The display apparatus 16 further includes an operation unit including a reset switch (not illustrated).

The fuel temperature sensor 18 is disposed in the transmission 6 to detect an ATF temperature TATF. The engine rotation speed sensor 20 detects a rotation speed Ne of the crankshaft 4 of the engine 2. The main shaft rotation speed sensor 22 serves as an input shaft rotation speed detector that detects a rotation speed Nm of the main shaft 10a. The counter shaft rotation speed sensor 24 serves as an output shaft rotation speed detector that detects a rotation speed Nc of the counter shaft 10b. The detection signals output from the sensors 18, 20, 22, and 24 are input to the ECU 12.

The vehicle has an ignition switch (IG switch) 26 mounted therein. The IG switch 26 is operated by a driver to start and stop the vehicle (the engine 2). In addition, the vehicle includes an IG switch sensor 28 that detects ON/OFF of the IG switch 26. The detection signal output from the IG switch sensor 28 is input to the ECU 12. The vehicle starts operating when the driver turns on the IG switch 26 (IG-ON) and stops operating when the driver turns off the IG switch 26 (IG-OFF).

The vehicle further includes an ambient temperature sensor 29 that detects the ambient temperature. A detection signal output from the ambient temperature sensor 29 is input to the ECU 12.

Figure 2:
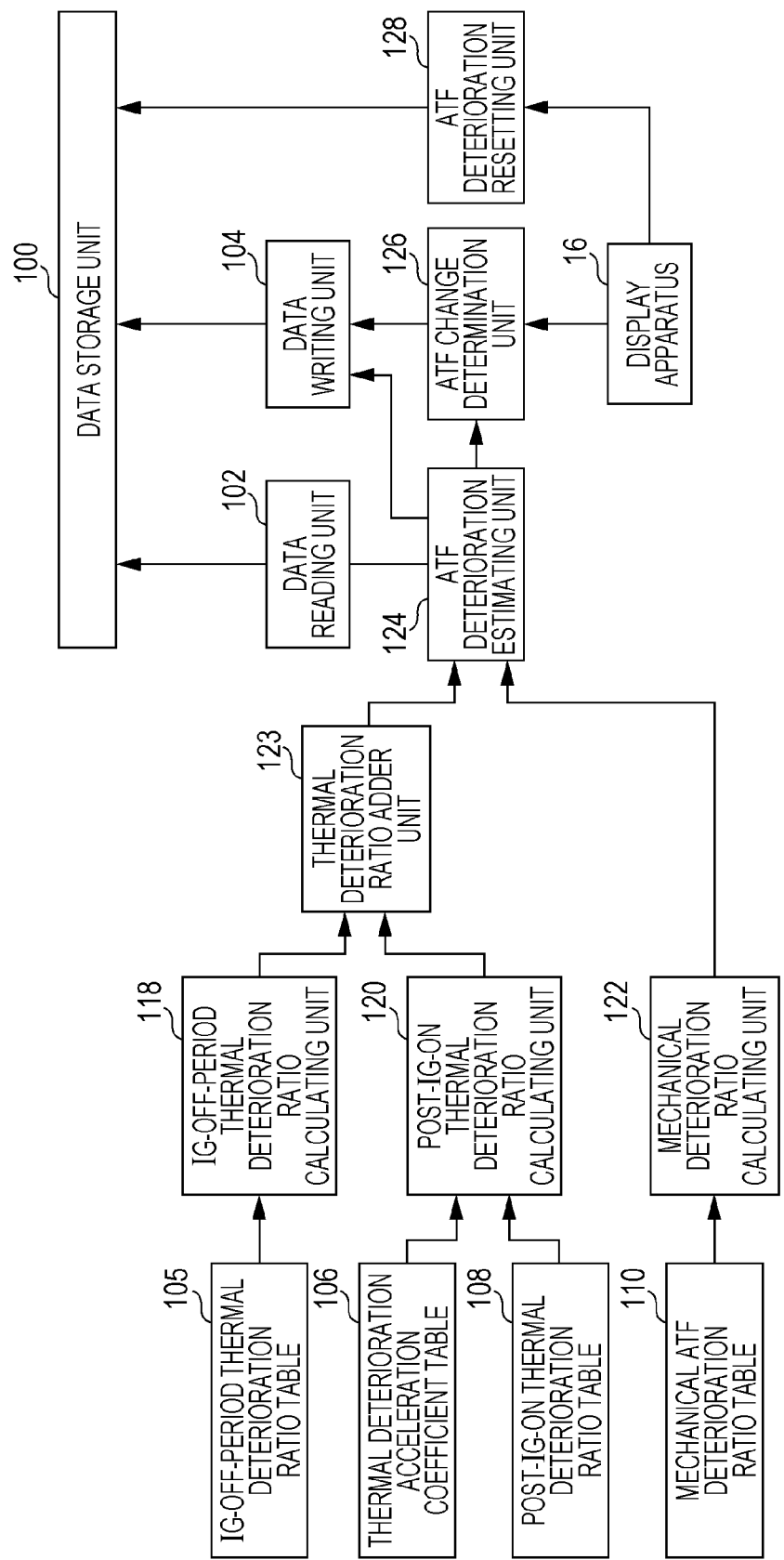
FIG. 2 is a block diagram of the ATF deterioration estimating apparatus.

FIG. 2 is a block diagram of an ATF deterioration estimating apparatus included in the ECU 12 according to the present disclosure. The function of the ATF deterioration estimating apparatus is realized by, for example, the ECU 12 executing a program stored in a ROM (not illustrated) of the ECU 12. The ATF deterioration estimating apparatus includes a data storage unit 100, a data reading unit 102, a data writing unit 104, and an IG-OFF-period thermal deterioration ratio table 105, a thermal deterioration acceleration coefficient table 106, a post-IG-ON thermal deterioration ratio table 108, and a mechanical ATF deterioration ratio table 110 stored in the ROM. The ATF deterioration estimating apparatus further includes an IG-OFF-period thermal deterioration ratio calculating unit (a first thermal deterioration ratio calculating unit) 118, a post-IG-ON thermal deterioration ratio calculating unit (a second thermal deterioration ratio calculating unit) 120, a thermal deterioration ratio adder unit (a third thermal deterioration ratio calculating unit) 123, a mechanical deterioration ratio calculating unit 122, an ATF deterioration estimating unit 124, an ATF change determination unit 126, and an ATF deterioration resetting unit 128.

The data storage unit 100 is an electrically erasable programmable read-only memory (EEPROM) that stores a distance traveled VCRUN, an ATF change flag F_CHANGEATF, an ATF change count ATFCNT, and ATF data used for ATF deterioration estimation, such as a thermal ATF deterioration LOILH (LOILH1+LOILH2) and a mechanical ATF deterioration LOILR.

The data reading unit 102 reads VCRUN, LOILH, and LOILR from the data storage unit 100 when the engine 2 starts due to IG-ON. The data writing unit 104 writes, to the data storage unit 100, LOILH and LOILR obtained when the engine 2 stops due to IG-OFF.

Figure 3A:
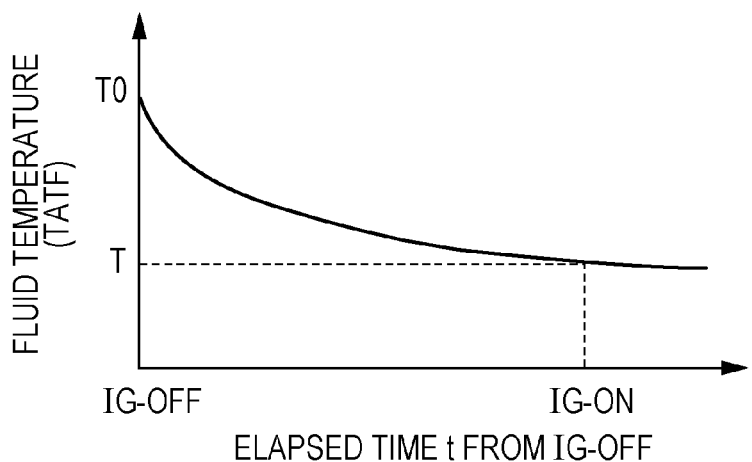
FIGS. 3A to 3C illustrate thermal deterioration ratio tables during IG-OFF.
Figure 3B:
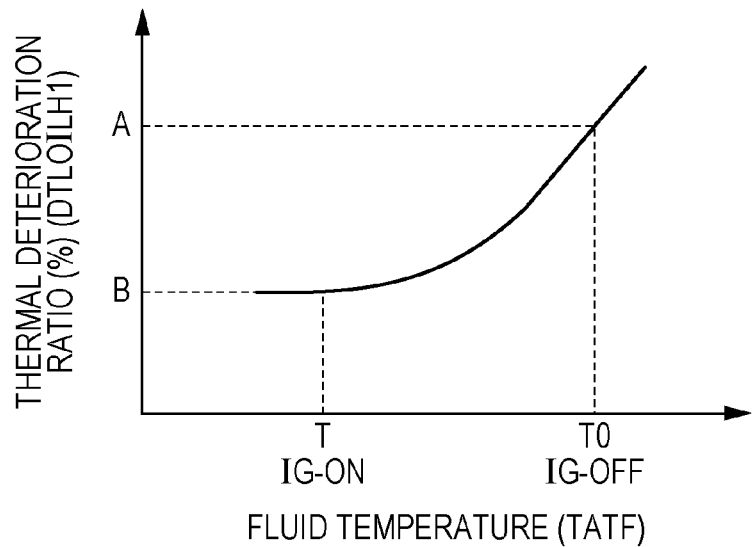
Figure 3C:
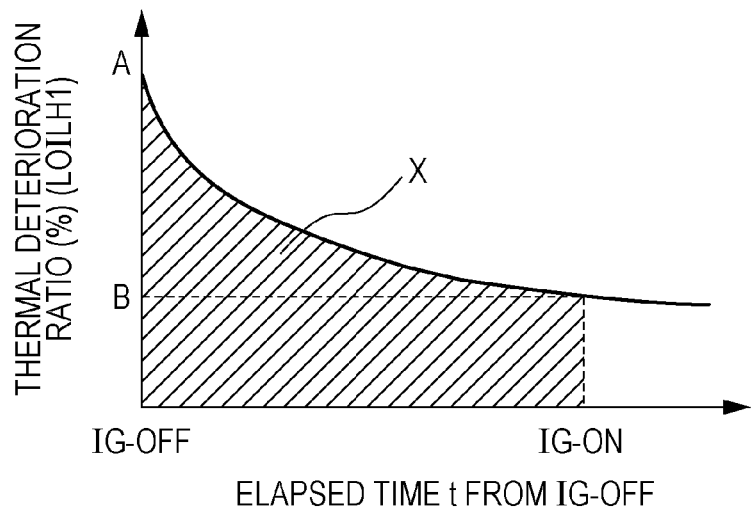

FIGS. 3A to 3C illustrate the IG-OFF-period thermal deterioration ratio table 105. More specifically, FIG. 3A illustrates an ATF temperature (estimated value) table indicating the ATF temperature vs. an elapsed time from IG-OFF. FIG. 3B illustrates a thermal deterioration ratio table indicating thermal deterioration ratio per unit time vs. an ATF temperature (a fuel temperature). FIG. 3C illustrates a thermal deterioration ratio (integrated value) table indicating a thermal deterioration ratio (an integrated value) vs. an elapsed time from IG-OFF.

As illustrated in FIG. 3A, in the ATF temperature (estimated value) table indicating the ATF temperature vs. an elapsed time from IG-OFF, the abscissa represents an elapsed time t (sec) (a time period over which ATF is left unused) from IG-OFF, and the ordinate represents an ATF temperature T (° C.). By using Newton's law of cooling, the ATF temperature T with respect to the elapsed time t from IG-OFF can be expressed as follows:

$$T = (T_0 - T_m)e^{-\frac{\alpha S}{C}t} + T_m \quad (1)$$

In equation (1), t represents the elapsed time (sec) from IG-OFF (a time period over which ATF is left unused), $T_0$ represents the ATF temperature (° C.) when t=0 (immediately after IG-OFF), T represents the ATF temperature (° C.) at a time t, Tm represents the ambient temperature (° C.), and αS/C represents the cooling characteristic coefficient of the vehicle. The cooling characteristic coefficient αS/C is determined from the heat dissipation characteristics of equipment, such as the torque converter 8 and the transmission 6. The ambient temperature Tm can be detected using the ambient temperature sensor 29. Note that if the vehicle does not include the ambient temperature sensor 29, the ambient temperature Tm can be obtained immediately after IG-ON by using the following equation:

$$T_m = \frac{T - T_0 \times e^{-\frac{\alpha S}{C} \times t}}{1 - e^{-\frac{\alpha S}{C} \times t}} \quad (2)$$

As illustrated in FIG. 3B, in the thermal deterioration ratio table indicating a thermal deterioration ratio per unit time vs. an ATF temperature, the abscissa represents the ATF temperature (TATF), and the ordinate represents the thermal deterioration ratio per unit time of ATF (DTLOILH1) (%). When the ATF temperature TATF varies from T to $T_0$, the thermal deterioration ratio per unit time DTLOILH1 is calculated using this table. As can be seen from FIG. 3B, the thermal deterioration ratio DTLOILH1 of ATF increases with increasing ATF temperature TATF.

As illustrated in FIG. 3C, in the thermal deterioration ratio table indicating a thermal deterioration ratio vs. an elapsed time from IG-OFF, the abscissa represents an elapsed time from IG-OFF (a time period over which ATF is left unused) t (sec), and the ordinate represents the thermal deterioration ratio of ATF (the integrated value) (LOILH1) (%). In this table, an integrated value LOILH1 of the thermal deterioration ratio over the elapsed time from IG-OFF is calculated using the ATF temperature TATF for the elapsed time from IG-OFF calculated in FIG. 3A and the thermal deterioration ratio per unit time DTLOILH1 for the ATF temperature TATF calculated in FIG. 3B. That is, the area of a portion X with hatchings in the graph illustrated in FIG. 3C represents the integrated value LOILH1 of the thermal deterioration ratio for the elapsed time from IG-OFF.

Figure 4:
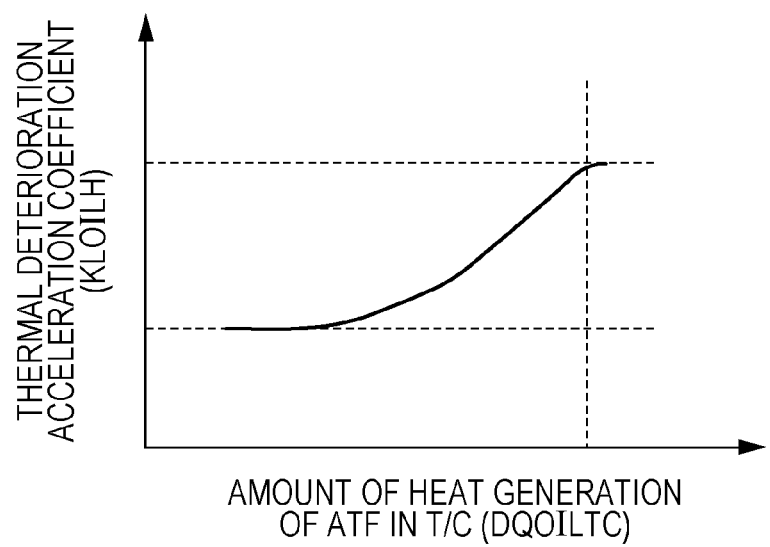

FIG. 4 illustrates the thermal deterioration acceleration coefficient table 106 after IG-ON. The abscissa represents the amount of heat generation of ATF in the T/C 8 (DQOILTC), and the ordinate represents the thermal deterioration acceleration coefficient (KLOILH). As can be seen from FIG. 4, KLOILH is a value determined in accordance with DQOILTC. In particular, if DQOILTC is within a predetermined range, deterioration of ATF is accelerated. Note that as described below, DQOILTC can be calculated from, for example, Ne, Nm, and the amplification factor of the T/C 8.

Figure 5:
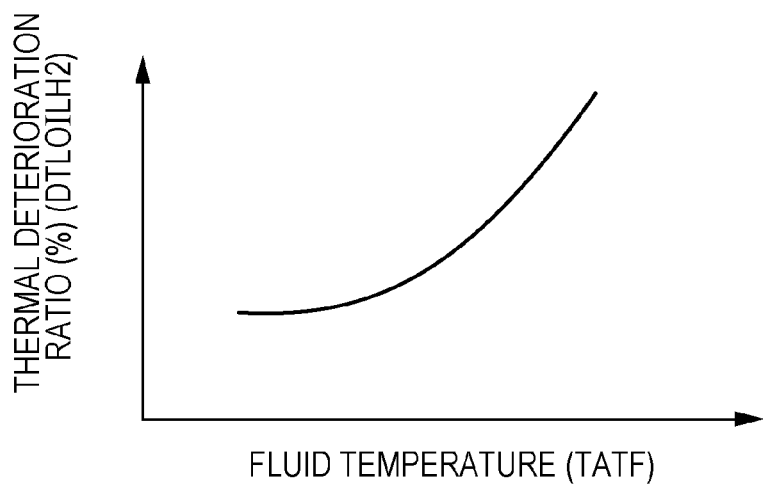

FIG. 5 illustrates the post-IG-ON thermal deterioration ratio table 108. In FIG. 5, the abscissa represents the fuel temperature (TATF), and the ordinate represents the thermal deterioration ratio (%) (DTLOILH2). As can be seen from FIG. 5, DTLOILH2 is a value determined in accordance with TATF. In particular, deterioration of ATF progresses with increasing TATF.

Figure 6:
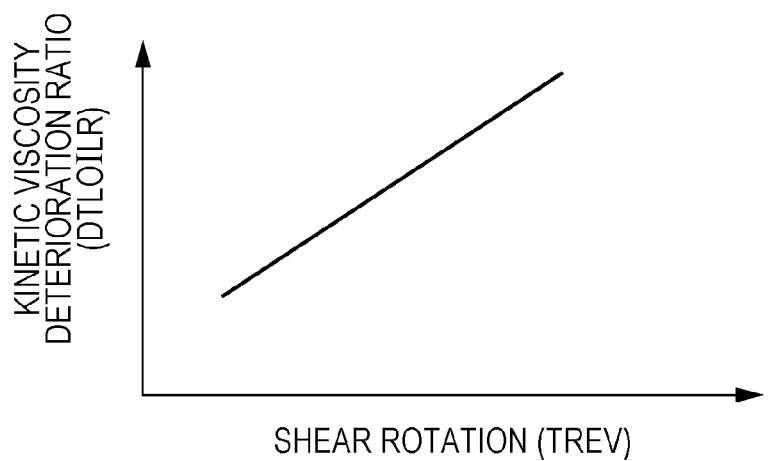
FIG. 6 illustrates a mechanical ATF deterioration ratio table.

FIG. 6 illustrates the mechanical ATF deterioration ratio table 110. In FIG. 6, the abscissa represents the shear rotation (TREV), and the ordinate represents the kinetic viscosity deterioration ratio (%) (DTLOILR). As can be seen from FIG. 6, DTLOILR is a value determined in accordance with TREV. In particular, deterioration of ATF progresses with increasing TREV.

The IG-OFF-period thermal deterioration ratio calculating unit 118 calculates the thermal deterioration ratio (the integrated value) LOILH1 during IG-OFF using the elapsed time from IG-OFF (the time period over which ATF is left unused) t (sec), the ATF temperature To (° C.) when t=0 (immediately after IG-OFF), the ATF temperature T (° C.) at a time t, and the ambient temperature Tm (° C.) in the tables illustrated in FIGS. 3A to 3C.

The post-IG-ON thermal deterioration ratio calculating unit 120 calculates DQOILTC using, for example, Ne and Nm and searches the thermal deterioration acceleration coefficient table 106 using the calculated DQOILTC. Thus, the post-IG-ON thermal deterioration ratio calculating unit 120 calculates KLOILH2. Thereafter, the post-IG-ON thermal deterioration ratio calculating unit 120 searches the post-IG-ON thermal deterioration ratio table 108 using TATF to calculate the DTLOILH2 and assigns (the previous LOILH2+DTLOILH2*KLOILH2) to the thermal ATF deterioration LOILH2.

The thermal deterioration ratio adder unit 123 sums the ATF thermal deterioration ratio (the thermal ATF deterioration) LOILH1 during IG-OFF calculated by the IG-OFF-period thermal deterioration ratio calculating unit 118 and the ATF thermal deterioration ratio (the thermal ATF deterioration) LOILH2 after IG-ON calculated by the post-IG-ON thermal deterioration ratio calculating unit 120.

The mechanical deterioration ratio calculating unit 122 calculates TREV using Ne, Nm, and Nc and searches the mechanical ATF deterioration ratio table 110 using the calculated TREV. Thus, the mechanical deterioration ratio calculating unit 122 calculates the mechanical ATF deterioration ratio DTLOILR and assigns (the previous LOILR+DTLOILR) to the mechanical ATF deterioration LOILR.

The ATF deterioration estimating unit 124 assigns the larger one of the sum of the thermal ATF deterioration LOILL1 during IG-OFF and the thermal ATF deterioration LOILL2 after IG-ON and the mechanical ATF deterioration LOILR to an ATF deterioration estimated value LOIL. The ATF change determination unit 126 calculates VCRUN using, for example, Nc. Thereafter, the ATF change determination unit 126 compares VCRUN with each of a maximum distance of the warranty coverage and a minimum distance of the warranty coverage and compares LOIL with an ATF change threshold value so as to determine whether an ATF change time is reached. If an ATF change time is not reached, the ATF change determination unit 126 assigns a no-change-required value '0' to the ATF change flag F_CHANGEATF. However, if the ATF change time is reached, the ATF change determination unit 126 assigns a change-required value '1' to the ATF change flag F_CHANGEATF and displays an ATF change alert message on the display apparatus 16.

The IG-OFF-period thermal deterioration ratio calculating unit 118 calculates LOILH1 immediately after the engine 2 starts by IG-ON. In contrast, the post-IG-ON thermal deterioration ratio calculating unit 120 and the mechanical deterioration ratio calculating unit 122 calculate LOILH2 and LOILR and the ATF deterioration estimating unit 124 estimates ATF deterioration at predetermined intervals (e.g., 1-second intervals) between start of the engine 2 by IG-ON and stoppage of the engine 2 by IG-OFF.

The ATF deterioration resetting unit 128 starts operating when a reset switch of the display apparatus 16 is pressed by an operator after ATF is changed or when a reset operation is performed by an operator using a PGM tester. In ATF change, a certain percent (e.g., about 40%) of old deteriorated ATF may remain inside the T/C 8 and a hydraulic control system. Accordingly, the ATF deterioration resetting unit 128 assigns an ATF deterioration reset value (a non-zero value) to LOILH1, LOILH2, and LOILR, assigns '0' to VCRUN, and assigns '0' to F_CHNGEATF and TATFFAIL. In addition, the ATF deterioration resetting unit 128 turns off the ATF change alert display and a fail alert display of, for example, TATF and increments ATFCNT by one. These values are written to the data storage unit 100.

If 60% of ATF is changeable and 40% of ATF is unchangeable, the ATF deterioration resetting unit 128 sets the ATF deterioration reset value to 0.4 (i.e., 40%). Alternatively, if, for example, the amount of remaining deteriorated ATF is 40% of the whole ATF and the deterioration ratio of the remaining deteriorated ATF is 50%, the ATF deterioration reset value is set to 0.4*0.5=0.2 (i.e., 20%).

Figure 13:
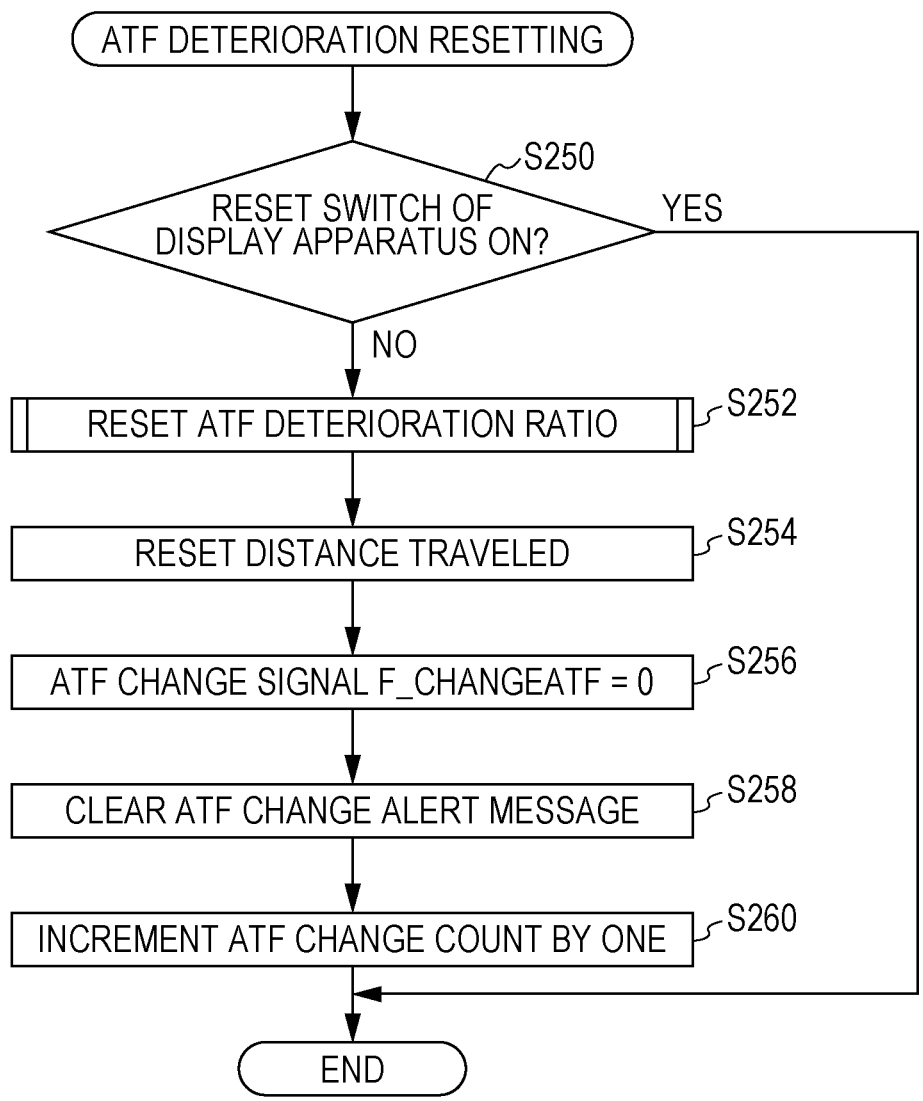
FIG. 13 is a flowchart of an ATF deterioration resetting process.
Figure 14:
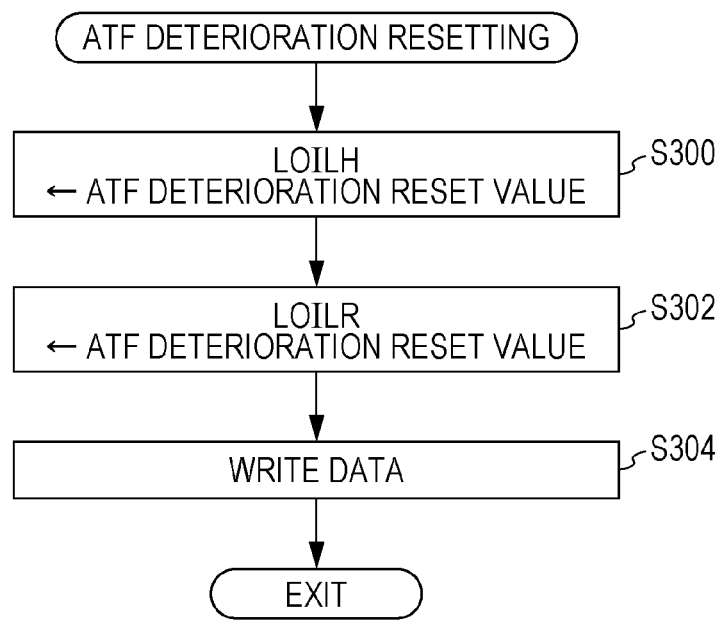
FIG. 14 is a flowchart of an ATF deterioration ratio resetting process.
Figure 15:
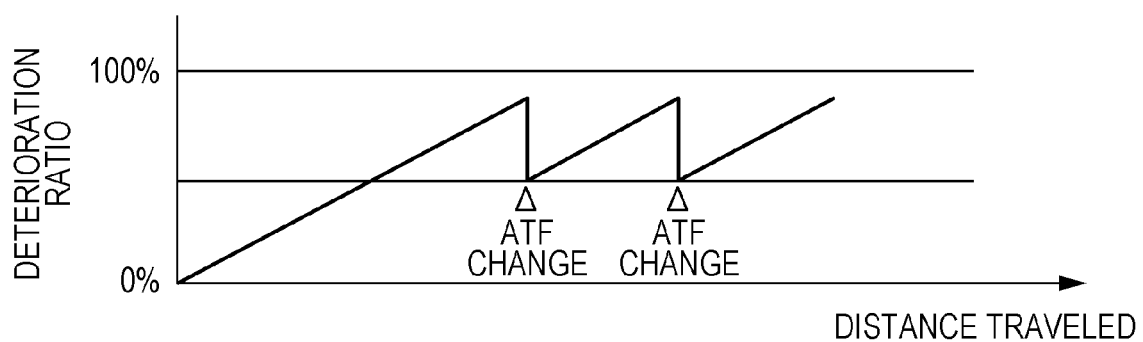
FIG. 15 illustrates resetting of an ATF deterioration ratio when ATF is changed.

FIGS. 7 to 12 are flowcharts illustrating an example of an ATF deterioration estimating operation according to the present disclosure. FIGS. 13 and 14 are flowcharts illustrating an example of an ATF deterioration resetting operation. FIG. 15 is a graph illustrating the ATF deterioration ratio in which the abscissa represents a distance traveled and the ordinate represents the ATF deterioration ratio LOIL.

Figure 7:
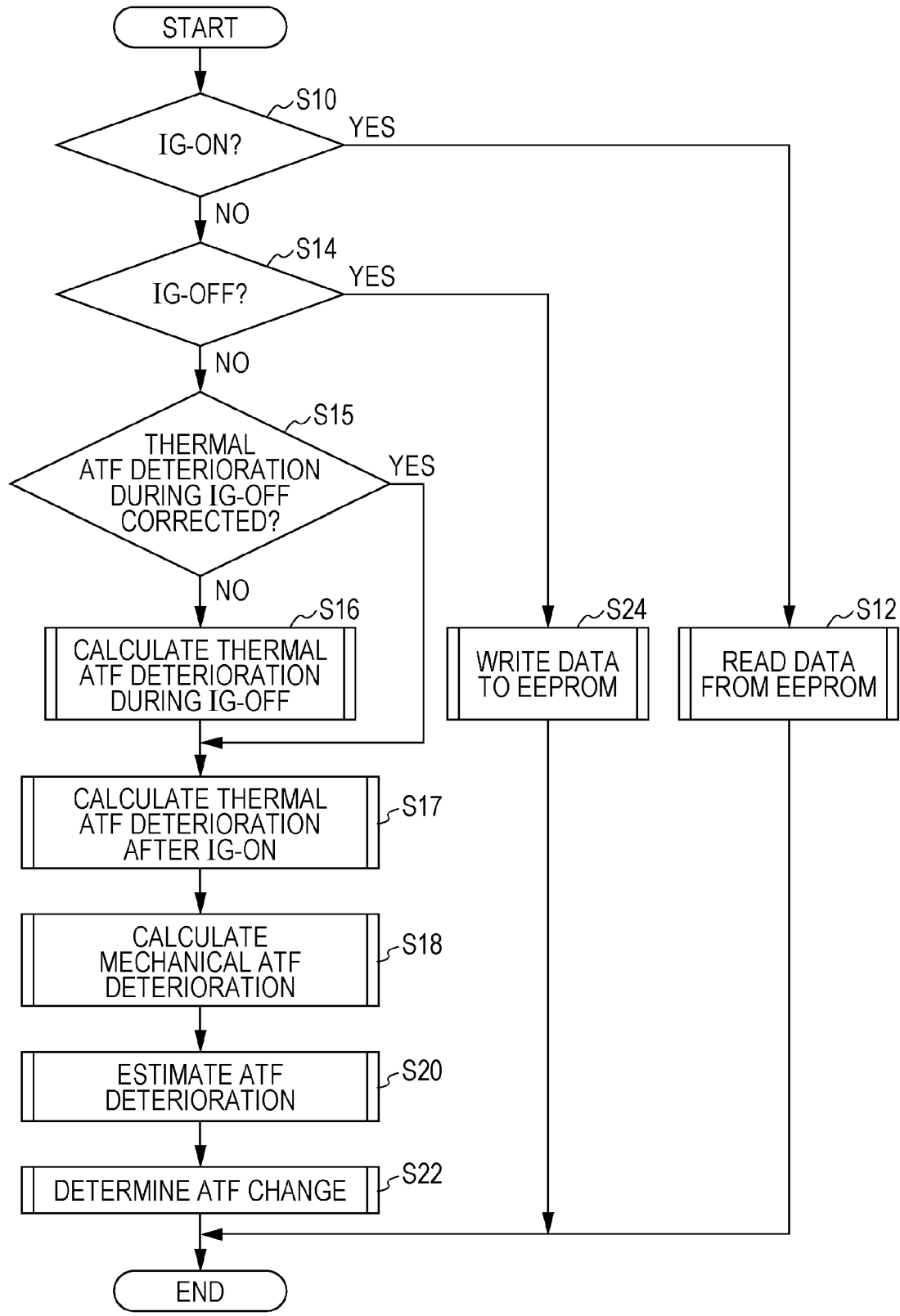
FIG. 7 is a flowchart illustrating the procedure for ATF deterioration estimating process.

In step S10 illustrated in FIG. 7, it is determined whether the engine 2 is started, that is, whether the ignition switch is turned on (IG-ON). The determination is positive (YES) only for the first time after the engine 2 is started by IG-ON. The next determination and the subsequent determinations are negative (NO).

If the determination is positive (YES), the processing proceeds to step S12, where VCRUN, LOILH, and LOILR are read from the data storage unit 100. However, if the determination in step S10 is negative (NO), the processing proceeds to step S14, where it is determined whether IG-OFF occurs (the engine 2 is stopped). If IG-OFF does not occur (the engine 2 is not stopped), that is, IG-ON occurs (the engine 2 is running), the processing proceeds to step S15, where it is determined whether the thermal ATF deterioration during IG-OFF is corrected. If the thermal ATF deterioration during IG-OFF is not corrected (NO), the processing proceeds to step S16, where the thermal ATF deterioration during IG-OFF is calculated.

Figure 8:
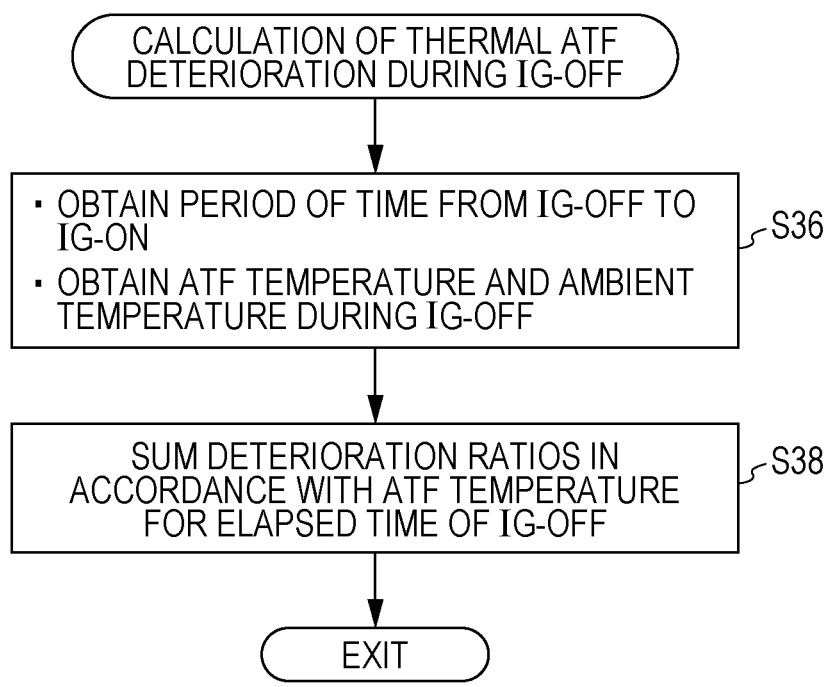
FIG. 8 is a flowchart of calculation of thermal ATF deterioration during IG-OFF.

In step S16, the thermal ATF deterioration during IG-OFF is calculated, as illustrated in FIG. 8. That is, in step S36, the elapsed time t (the time period over which ATF is left unused) from IG-OFF to IG-ON is obtained, and the ATF temperature To and the ambient temperature Tm at a time of IG-OFF are obtained. In step S38, the thermal deterioration ratios per unit time during the elapsed time from t=0 to t are summed. Thus, the thermal ATF deterioration for the ATF temperature during the elapsed time from t=0 to t is calculated.

If the thermal ATF deterioration during IG-OFF is calculated in step S16 or if the thermal ATF deterioration during IG-OFF is corrected in step S15 (YES), the processing proceeds to step S17, where the thermal ATF deterioration after IG-ON is calculated. The calculation of the thermal ATF deterioration after IG-ON in step S17 is performed as illustrated in FIG. 9.

Figure 9:
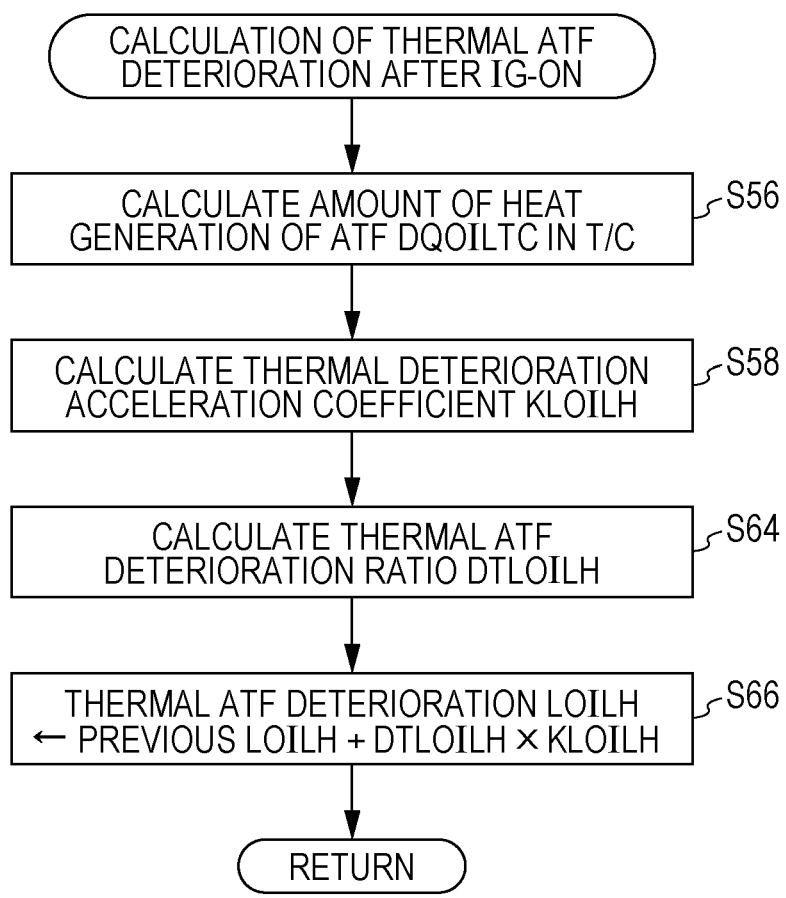

In step S56 illustrated in FIG. 9, the amount of heat generation of ATF in the T/C 8 is calculated. That is, let DQOILTC be the amount of heat generation of ATF in the T/C 8. Then, DQOILTC can be calculated as follows:

$$DQOILTC=|TQIN*Ne-TQOUT*Nm|$$

where
TQIN: T/C pump absorption torque (input torque),
TQOUT: T/C turbine torque (output torque),
Ne: engine speed, and
Nm: main shaft rotation speed.
TQIN and TQOUT can be expressed as follows:

$$TQIN=\tau*(Ne/1000)2*9.8*2*3.14/60, \text{ and}$$

$$TQOUT=KTR*(TQIN).$$

Accordingly, $$DQOILTC=|TQIN(Ne-KTR*Nm)|=|\tau*(Ne/1000)2*(Ne-KTR\times Nm)|*9.8*2*3.14/60,$$

where τ: T/C pump absorption torque coefficient, and
KTR: T/C torque ratio.

Subsequently, in step S58, the thermal deterioration acceleration coefficient table 106 is searched to obtain the thermal deterioration acceleration coefficient KLOILH corresponding to the amount of heat generation of ATF in the T/C 8. Thereafter, the processing proceeds to step S64.

In step S64, the post-IG-ON thermal deterioration ratio table 108 is searched using TATF to detect the ATF thermal deterioration ratio DTLOILH.

Subsequently, the processing proceeds to step S66, where the thermal ATF deterioration LOILH is calculated. That is, (the previous LOILH+DTLOILH*KLOILH) is assigned to LOILH. Thereafter, the processing returns to step S18 in FIG. 7.

Figure 10:
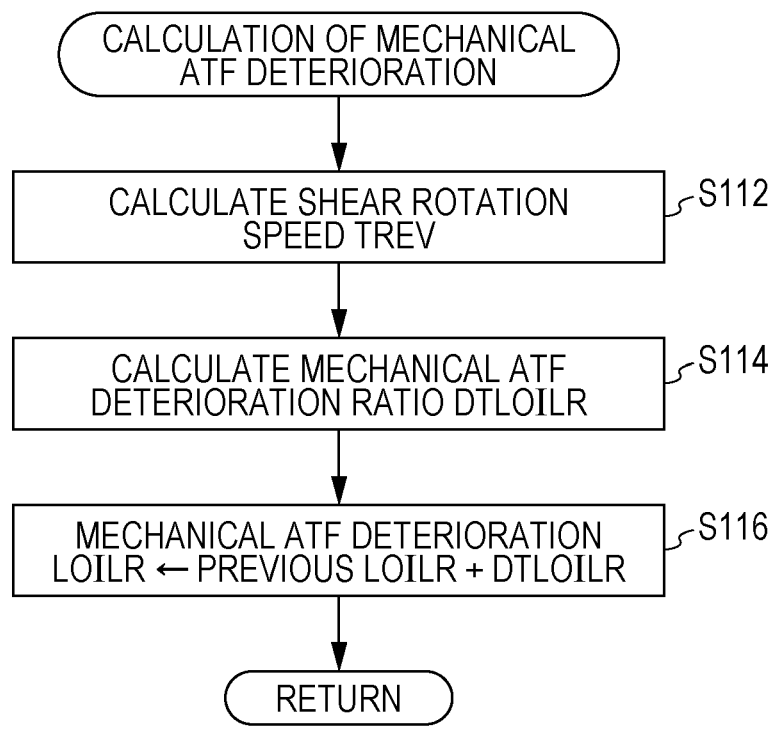
FIG. 10 is a flowchart of calculation of mechanical ATF deterioration.

In step S18, the mechanical ATF deterioration LOILR illustrated in FIG. 10 is calculated. In step S112 illustrated in FIG. 10, the shear rotation speed TREV is calculated on the basis of Ne, Nm, and Nc.

That is, the following calculation is performed:

$$TREV=Ne\times K1+Nm\times K2+Nc\times K3,$$

where each of K1, K2, and K3 denotes a coefficient for correcting the influence level for mechanical deterioration of a rotating part. K1, K2, and K3 are determined on the basis of, for example, the numbers of gear tooth and the numbers of bearings of rotation members.

Subsequently, the processing proceeds to step S114, where the mechanical ATF deterioration ratio table 110 is searched using TREV to calculate the mechanical ATF deterioration ratio DTLOILR corresponding to TREV.

Subsequently, the processing proceeds to step S116, where the mechanical ATF deterioration LOILR is calculated. That is, (the previous LOILR+DTLOILR) is assigned to LOILR. Thereafter, the processing returns to step S20 illustrated in FIG. 7.

Figure 11:
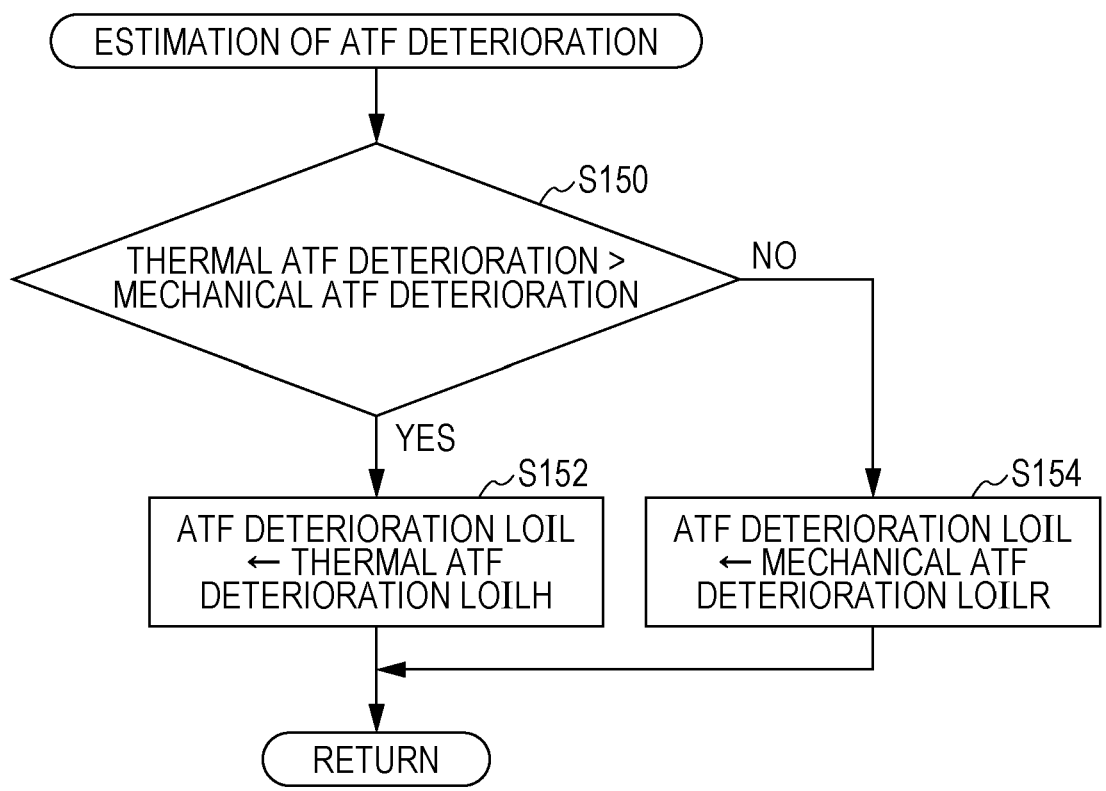
FIG. 11 is a flowchart of an ATF deterioration estimation process.

In step S20, the ATF deterioration estimating process illustrated in FIG. 11 is performed. As illustrated in FIG. 11, in step S150, it is determined whether the thermal ATF deterioration LOILH (LOILH1+LOILH2)>the mechanical ATF deterioration LOILR. If the determination is positive (YES), the processing proceeds to step S152, where the thermal ATF deterioration LOILH (LOILH1+LOILH2) is assigned to the ATF deterioration LOIL. However, if the determination is negative (NO), the processing proceeds to step S154, where the mechanical ATF deterioration LOILR is assigned to the ATF deterioration LOIL. Thereafter, the processing returns to step S22 illustrated in FIG. 7.

Figure 12:
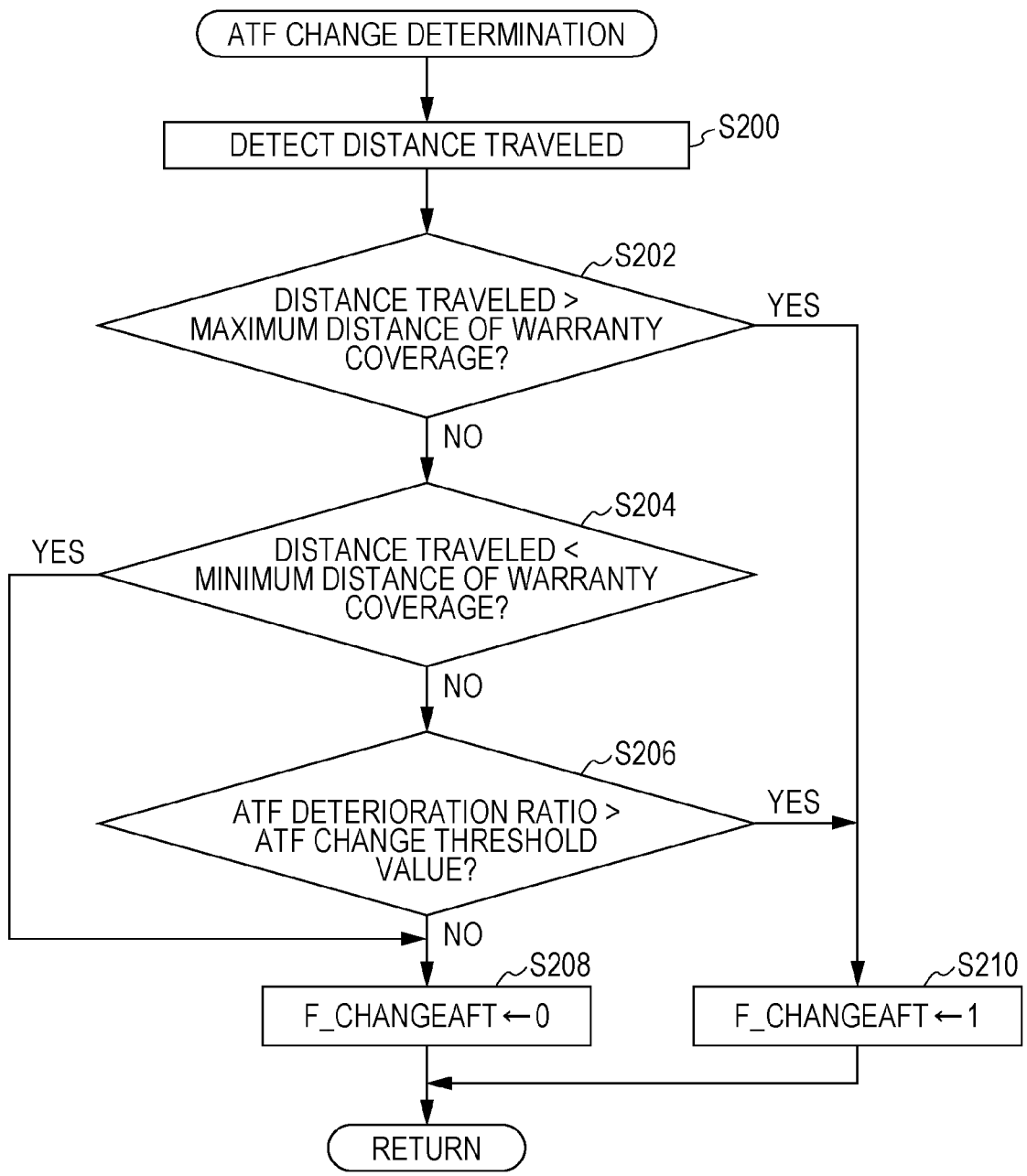
FIG. 12 is a flowchart of an ATF change determination process.

In step S22, the ATF change determination process illustrated in FIG. 12 is performed. As illustrated in FIG. 12, in step S200, the distance traveled is calculated on the basis of Nc. That is, let RATIO be the final gear ratio, and let RTIRE be the radius of the tire. Then, the distance traveled is expressed as follows:

distance traveled=vehicle speed×time.

Since vehicle speed=(tire rotation speed per unit time)×distance traveled per tire rotation=(Nc/RATIO)×(2π×RTIRE), the previous VCRUN+vehicle speed (the distance per second) is assigned to VCRUN.

In step S202, it is determined whether VCRUN is greater than a maximum distance of the warranty coverage. If the determination in step S202 is negative (NO), the processing proceeds to step S204, where it is determined whether the distance traveled VCRUN is less than a minimum distance of the warranty coverage.

If the determination in step S204 is negative (NO), the processing proceeds to step S206, where it is determined whether the ATF deterioration is greater than an ATF change threshold value. If it is determined that the ATF deterioration is greater than the ATF change threshold value, the processing proceeds to step S210, where "1" is assigned to the ATF change flag F_CHANGEATF and, in addition, an ATF change alert message is displayed on the display apparatus 16. However, if the determination in step S206 is negative (NO), "0" is assigned to the ATF change flag F_CHANGEATF in step S208.

In contrast, if, in step S202, it is determined that the distance traveled VCRUN is greater than a maximum distance of the warranty coverage (YES), the processing proceeds to step S210, where "1" is assigned to the ATF change flag F_CHANGEATF and, in addition, an ATF change alert message is displayed on the display apparatus 16. However, if, in step S204, it is determined that the distance traveled VCRUN is less than the minimum distance of the warranty coverage (YES), the processing proceeds to step S208, where "0" is assigned to the ATF change flag F_CHANGEATF. Thereafter, the processing returns to step S10 illustrated in FIG. 7. The processes in steps S10 to S22 are repeated at predetermined intervals (1-second intervals).

If, in step S14 of FIG. 7, it is determined that the engine 2 is shut down by IG-OFF, the processing proceeds to step S24, where LOILH (LOILH+LOILH2), LOILR, F_CHANGEATF, TATFFAIL to NcFAIL, and VCRUN are written to the data storage unit 100. Thereafter, the processing is completed.

Since the ATF change alert message is displayed on the display apparatus 16, the operator changes ATF. After the ATF change is completed, the operator turns on the reset switch of the display apparatus 16. In step S250 illustrated in FIG. 13, it is determined whether the reset switch of the display apparatus 16 is turned on. If the determination is positive (YES), the processing proceeds to step S252. However, if the determination is negative (NO), the processing is completed. In step S252, the ATF deterioration resetting process illustrated in FIG. 14 is performed.

As illustrated in FIG. 14, in step S300, the ATF deterioration reset value (e.g., 0.4) is assigned to LOILH. Thereafter, the processing proceeds to step S302. In step S302, the ATF deterioration reset value (e.g., 0.4) is assigned to LOILR, and the processing proceeds to step S304. In step S304, LOILH and LOILR are written to the data storage unit 100. Thereafter, the processing returns to step S254 illustrated in FIG. 11. As illustrated in FIG. 15, when ATF is changed, the ATF deterioration ratio is reset to, for example, 0.4 (i.e., 40%) on the basis of the remaining amount of deteriorated ATF. Accordingly, the deterioration of ATF is not underestimated.

When ATF is changed, it is difficult to change ATF inside the torque converter and the hydraulic control system and, thus, the change ratio is not 100%. Accordingly, even when ATF is changed, the deteriorated ATF still remains and, thus, the ATF deterioration ratio is not 0. Consequently, if the deterioration estimated value is reset to 0 when ATF is changed, a significant error occurs between the deterioration ratio and the real deterioration ratio. Thus, according to the present exemplary embodiment, when ATF is changed, the ATF deterioration ratio is reset to an appropriate value based on the remaining amount of deteriorated ATF.

As illustrated in FIG. 13, in step S254, '0' is assigned to the distance traveled VCRUN, which is written to the data storage unit 100. In step S256, '0' is assigned to F_CHANGEATF, which is written to the data storage unit 100. In step S258, the ATF change alert message displayed on the display apparatus 16 is cleared. In step S260, the ATF change count ATFCNT is incremented by one and is written to the data storage unit 100.

As described above, according to the present exemplary embodiment, the hydraulic oil deterioration ratio estimating apparatus includes the thermal deterioration ratio calculating unit (the first thermal deterioration ratio calculating unit) 118 configured to calculate a thermal deterioration ratio of the hydraulic oil during stoppage of the vehicle (during IG-OFF) on the basis of an estimated value of a change in temperature of the hydraulic oil from the previous stoppage of the vehicle to start of the vehicle, the thermal deterioration ratio calculating unit (the second thermal deterioration ratio calculating unit) 120 configured to calculate the current thermal deterioration ratio of the hydraulic oil after the vehicle starts operating by calculating the current thermal deterioration ratio of the hydraulic oil on basis of the temperature of the hydraulic oil detected by the fuel temperature sensor 18 and adding the calculated thermal deterioration ratio to a previously calculated thermal deterioration ratio, the thermal deterioration ratio adder unit 123 (the third thermal deterioration ratio calculating unit) configured to calculate the current thermal deterioration ratio of the hydraulic oil by summing the thermal deterioration ratio during stoppage of the vehicle calculated by the thermal deterioration ratio calculating unit 118 and the thermal deterioration ratio after the vehicle starts operating calculated by the deterioration ratio calculating unit 120, the mechanical deterioration ratio calculating unit 122 configured to calculate the current mechanical deterioration ratio of the hydraulic oil and add the calculated mechanical deterioration ratio to a previously calculated mechanical deterioration ratio, and the ATF deterioration estimating unit (the deterioration ratio comparing unit) 124 configured to compare the current thermal deterioration ratio calculated by the thermal deterioration ratio adder unit 123 with the mechanical deterioration ratio calculated by the mechanical deterioration ratio calculating unit 122 and select a larger one of the current thermal deterioration ratio and the mechanical deterioration ratio as an estimated value of the deterioration ratio of the hydraulic oil.

According to the present disclosure, the hydraulic oil deterioration ratio estimating apparatus of a vehicle can calculate a current thermal deterioration ratio of the hydraulic oil by calculating the thermal deterioration ratio of the hydraulic oil during stoppage of the vehicle using the thermal deterioration ratio calculating unit 118 and adding the calculated thermal deterioration ratio to the thermal deterioration ratio after the vehicle starts operating calculated using the thermal deterioration ratio calculating unit 120. That is, since the thermal environment during stoppage of the vehicle and the deterioration conditions caused by the high heat of the hydraulic oil after the vehicle has traveled can be estimated, a situation in which although deterioration of the hydraulic oil progresses in reality, the estimated value of the thermal deterioration does not appropriately rise can be prevented. Accordingly, the detection accuracy of the thermal deterioration ratio of the hydraulic oil can be increased, since a more appropriate thermal deterioration ratio of the hydraulic oil including the thermal deterioration ratio during stoppage of the vehicle can be calculated.

In addition, according to the above-described hydraulic oil deterioration ratio estimating apparatus of a vehicle, the IG-OFF-period thermal deterioration ratio calculating unit 118 calculates the thermal deterioration ratio of the hydraulic oil from the time the vehicle previously stops to the time the vehicle starts on the basis of an estimated value of a change in temperature of the hydraulic oil from the time the vehicle previously stops to the time the vehicle starts and the thermal deterioration ratio per unit time of the hydraulic oil.

According to such a configuration, a deterioration level of the hydraulic oil caused by the thermal environment during stoppage of the vehicle and the heat generated after the vehicle starts operating can be more accurately estimated. As a result, the thermal deterioration ratio during stoppage of the vehicle can be more accurately calculated.

In the preceding specification, the disclosure has been described with reference to a specific exemplary embodiment. It will, however, be evident that various modifications and changes may be made without departing from the broader spirit and scope of the disclosure and the technical aspect of the specification and drawings.

According to an aspect of the present disclosure, a hydraulic oil deterioration ratio estimating apparatus for use in a vehicle is provided. The apparatus includes a torque converter configured to transfer a drive force of an engine to an input shaft using hydraulic oil, an automatic transmission configured to change a rotation speed of the input shaft rotated by the drive force through hydraulic control using the hydraulic oil and output the rotation to an output shaft, an oil temperature detector configured to detect a temperature of the hydraulic oil, an engine speed detecting unit configured to detect an engine speed of the engine, an input shaft rotation speed detector configured to detect a rotation speed of the input shaft of the automatic transmission, an output shaft rotation speed detector configured to detect a rotation speed of the output shaft of the automatic transmission, and a hydraulic oil deterioration ratio estimating unit configured to estimate a deterioration ratio of the hydraulic oil. The hydraulic oil deterioration ratio estimating unit includes a first thermal deterioration ratio calculating unit configured to calculate a thermal deterioration ratio of the hydraulic oil during stoppage of the vehicle on the basis of an estimated value of a change in temperature of the hydraulic oil from stoppage of the vehicle to start of the vehicle, a second thermal deterioration ratio calculating unit configured to calculate the current thermal deterioration ratio of the hydraulic oil on the basis of the temperature of the hydraulic oil detected by the oil temperature detector, add the calculated thermal deterioration ratio to a previously calculated thermal deterioration ratio, and calculate the thermal deterioration ratio after the vehicle starts operating, a third thermal deterioration ratio calculating unit configured to calculate the current thermal deterioration ratio of the hydraulic oil by summing the thermal deterioration ratio during stoppage of the vehicle calculated by the first thermal deterioration ratio calculating unit and the thermal deterioration ratio after the vehicle starts operating calculated by the second thermal deterioration ratio calculating unit, a mechanical deterioration ratio calculating unit configured to calculate a shear rotation speed of the hydraulic oil from the engine speed detected by the engine speed detecting unit, the rotation speed of the input shaft detected by the input shaft rotation speed detector, and the rotation speed of the output shaft detected by the output shaft rotation speed detector, calculate the current mechanical deterioration ratio of the hydraulic oil on the basis of the calculated shear rotation speed, and add the mechanical deterioration ratio to a previously calculated mechanical deterioration ratio, and a deterioration ratio comparing unit configured to compare the current thermal deterioration ratio calculated by the third thermal deterioration ratio calculating unit with the mechanical deterioration ratio calculated by the mechanical deterioration ratio calculating unit and select a larger one of the current thermal deterioration ratio and the mechanical deterioration ratio as an estimated value of the deterioration ratio of the hydraulic oil.

According to the present disclosure, the hydraulic oil deterioration ratio estimating apparatus of a vehicle can calculate a current thermal deterioration ratio of the hydraulic oil by calculating the thermal deterioration ratio of the hydraulic oil during stoppage of the vehicle using the first thermal deterioration ratio calculating unit and adding the calculated thermal deterioration ratio to the thermal deterioration ratio after the vehicle starts operating calculated using the second thermal deterioration ratio calculating unit. That is, since the thermal environment during stoppage of the vehicle and the deterioration conditions caused by the high heat of the hydraulic oil after the vehicle has traveled can be estimated, a situation in which although deterioration of the hydraulic oil progresses in reality, the estimated value of the thermal deterioration does not appropriately rise can be prevented. Accordingly, the detection accuracy of the thermal deterioration ratio of the hydraulic oil can be increased, since a more appropriate thermal deterioration ratio of the hydraulic oil including the thermal deterioration ratio during stoppage of the vehicle can be calculated.

It is desirable that the first thermal deterioration ratio calculating unit calculate the thermal deterioration ratio of the hydraulic oil from a time the vehicle stops operating to a time the vehicle starts operating on the basis of an estimated value of a change in temperature of the hydraulic oil from a time the vehicle previously stops operating to a time the vehicle starts operating and a thermal deterioration ratio per unit time of the hydraulic oil.

According to such a configuration, a deterioration level of the hydraulic oil caused by the thermal environment during stoppage of the vehicle and the heat generated after the vehicle starts operating can be more accurately estimated. As a result, the thermal deterioration ratio during stoppage of the vehicle can be more accurately calculated. Note that the reference numerals in parentheses correspond to those of elements of an exemplary embodiment described below.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic oil deterioration ratio estimating apparatus for use in a vehicle, comprising:
   a torque converter configured to transfer a drive force of an engine to an input shaft using hydraulic oil;
   an automatic transmission configured to change a rotation speed of the input shaft rotated by the drive force through hydraulic control using the hydraulic oil and output the rotation to an output shaft;
   an oil temperature detector configured to detect a temperature of the hydraulic oil;
   an engine speed detector configured to detect an engine speed of the engine;
   an input shaft rotation speed detector configured to detect a rotation speed of the input shaft of the automatic transmission;
   an output shaft rotation speed detector configured to detect a rotation speed of the output shaft of the automatic transmission; and
   a hydraulic oil deterioration ratio estimating unit configured to estimate a deterioration ratio of the hydraulic oil,
   wherein the hydraulic oil deterioration ratio estimating unit includes:
      a first thermal deterioration ratio calculating unit configured to calculate a thermal deterioration ratio of the hydraulic oil during stoppage of the vehicle on the basis of an estimated value of a change in temperature of the hydraulic oil from stoppage of the vehicle to start of the vehicle,
      a second thermal deterioration ratio calculating unit configured to calculate a first current thermal deterioration ratio of the hydraulic oil on the basis of the temperature of the hydraulic oil detected by the oil temperature detector, add the calculated first current thermal deterioration ratio to a previously calculated thermal deterioration ratio, and calculate the thermal deterioration ratio after the vehicle starts operating,
      a third thermal deterioration ratio calculating unit configured to calculate a second current thermal deterioration ratio of the hydraulic oil by summing the thermal deterioration ratio during stoppage of the vehicle calculated by the first thermal deterioration ratio calculating unit and the thermal deterioration ratio after the vehicle starts operating calculated by the second thermal deterioration ratio calculating unit,
      a mechanical deterioration ratio calculating unit configured to calculate a shear rotation speed of the hydraulic oil from the engine speed detected by the engine speed detector, the rotation speed of the input shaft detected by the input shaft rotation speed detector, and the rotation speed of the output shaft detected by the output shaft rotation speed detector, calculate the current mechanical deterioration ratio of the hydraulic oil on the basis of the calculated shear rotation speed, and add the mechanical deterioration ratio to a previously calculated mechanical deterioration ratio, and
      a deterioration ratio comparing unit configured to compare the second current thermal deterioration ratio calculated by the third thermal deterioration ratio calculating unit with the mechanical deterioration ratio calculated by the mechanical deterioration ratio calculating unit and select a larger one of the second current thermal deterioration ratio and the mechanical deterioration ratio as an estimated value of the deterioration ratio of the hydraulic oil.

2. The hydraulic oil deterioration ratio estimating apparatus according to claim 1, wherein the first thermal deterioration ratio calculating unit calculates the thermal deterioration ratio of the hydraulic oil from a time the vehicle stops operating to a time the vehicle starts operating on the basis of an estimated value of a change in temperature of the hydraulic oil from a time the vehicle previously stops operating to a time the vehicle starts operating and a thermal deterioration ratio per unit time of the hydraulic oil.

3. A hydraulic oil deterioration ratio estimating apparatus in a vehicle, comprising:
   a torque converter configured to transfer a drive force of an engine to an input shaft using hydraulic oil;
   an automatic transmission configured to change a rotation speed of the input shaft rotated by the drive force through hydraulic control using the hydraulic oil and configured to output a rotation to an output shaft;
   an oil temperature detector configured to detect a temperature of the hydraulic oil;
   an engine speed detector configured to detect an engine speed of the engine;
   an input shaft rotation speed detector configured to detect the rotation speed of the input shaft of the automatic transmission;
   an output shaft rotation speed detector configured to detect a rotation speed of the output shaft of the automatic transmission; and
   a hydraulic oil deterioration ratio estimator configured to estimate a deterioration ratio of the hydraulic oil, the hydraulic oil deterioration ratio estimator comprising:
      a first thermal deterioration ratio calculator configured to calculate a first thermal deterioration ratio of the hydraulic oil during stoppage of the vehicle based on an estimated value of a change in temperature of the hydraulic oil from the stoppage of the vehicle to start of the vehicle;
      a second thermal deterioration ratio calculator configured to calculate a first current thermal deterioration ratio of the hydraulic oil based on the temperature of the hydraulic oil detected by the oil temperature detector and configured to add the first current thermal deterioration ratio to an integrated value of the first current thermal deterioration ratio to calculate a second thermal deterioration ratio of the hydraulic oil after the vehicle starts operating;
      a third thermal deterioration ratio calculator configured to sum the first thermal deterioration ratio during the stoppage of the vehicle calculated by the first thermal deterioration ratio calculator and the second thermal deterioration ratio after the vehicle starts operating calculated by the second thermal deterioration ratio calculator to calculate a second current thermal deterioration ratio of the hydraulic oil;
      a mechanical deterioration ratio calculator configured to calculate a shear rotation speed of the hydraulic oil from the engine speed detected by the engine speed detector, the rotation speed of the input shaft detected by the input shaft rotation speed detector, and the rotation speed of the output shaft detected by the output shaft rotation speed detector, configured to calculate a current mechanical deterioration ratio of the hydraulic oil based on the shear rotation speed, and configured to add the current mechanical deterioration ratio to an integrated value of the current mechanical deterioration ratio to calculate a mechanical deterioration ratio of the hydraulic oil; and a deterioration ratio comparator configured to compare the second current thermal deterioration ratio calculated by the third thermal deterioration ratio calculator with the mechanical deterioration ratio calculated by the mechanical deterioration ratio calculator to select a larger one of the second current thermal deterioration ratio and the mechanical deterioration ratio as an estimated value of the deterioration ratio of the hydraulic oil.

4. The hydraulic oil deterioration ratio estimating apparatus according to claim 3, wherein the first thermal deterioration ratio calculator is configured to calculate the first thermal deterioration ratio of the hydraulic oil from a first time the vehicle stops operating to a second time the vehicle starts operating based on an estimated value of a change in temperature of the hydraulic oil from the first time to the second time and a thermal deterioration ratio per unit time of the hydraulic oil.

5. A hydraulic oil deterioration ratio estimating apparatus in a vehicle, comprising:

a torque converter configured to transfer a drive force of an engine to an input shaft using hydraulic oil;

an automatic transmission configured to change a rotation speed of the input shaft rotated by the drive force through hydraulic control using the hydraulic oil and configured to output a rotation to an output shaft;

oil temperature detecting means for detecting a temperature of the hydraulic oil;

engine speed detecting means for detecting an engine speed of the engine;

input shaft rotation speed detecting means for detecting the rotation speed of the input shaft of the automatic transmission;

output shaft rotation speed detecting means for detecting a rotation speed of the output shaft of the automatic transmission; and hydraulic oil deterioration ratio estimating means for estimating a deterioration ratio of the hydraulic oil, the hydraulic oil deterioration ratio estimating means comprising:

first thermal deterioration ratio calculating means for calculating a first thermal deterioration ratio of the hydraulic oil during stoppage of the vehicle based on an estimated value of a change in temperature of the hydraulic oil from the stoppage of the vehicle to start of the vehicle;

second thermal deterioration ratio calculating means for calculating a first current thermal deterioration ratio of the hydraulic oil based on the temperature of the hydraulic oil detected by the oil temperature detecting means and for adding the first current thermal deterioration ratio to an integrated value of the first current thermal deterioration ratio to calculate a second thermal deterioration ratio of the hydraulic oil after the vehicle starts operating;

third thermal deterioration ratio calculating means for summing the first thermal deterioration ratio during the stoppage of the vehicle calculated by the first thermal deterioration ratio calculating means and the second thermal deterioration ratio after the vehicle starts operating calculated by the second thermal deterioration ratio calculating means to calculate a second current thermal deterioration ratio of the hydraulic oil;

mechanical deterioration ratio calculating means for calculating a shear rotation speed of the hydraulic oil from the engine speed detected by the engine speed detecting means, the rotation speed of the input shaft detected by the input shaft rotation speed detecting means, and the rotation speed of the output shaft detected by the output shaft rotation speed detecting means, for calculating a current mechanical deterioration ratio of the hydraulic oil based on the shear rotation speed, and for adding the current mechanical deterioration ratio to an integrated value of the current mechanical deterioration ratio to calculate a mechanical deterioration ratio of the hydraulic oil; and deterioration ratio comparing means for comparing the second current thermal deterioration ratio calculated by the third thermal deterioration ratio calculating means with the mechanical deterioration ratio calculated by the mechanical deterioration ratio calculating means to select a larger one of the second current thermal deterioration ratio and the mechanical deterioration ratio as an estimated value of the deterioration ratio of the hydraulic oil.

6. A hydraulic oil deterioration ratio estimating apparatus for use in a vehicle, comprising:

a torque converter configured to transfer a drive force of an engine to an input shaft using hydraulic oil;

an automatic transmission configured to change a rotation speed of the input shaft rotated by the drive force through hydraulic control using the hydraulic oil and output the rotation to an output shaft;

an oil temperature detector configured to detect a temperature of the hydraulic oil;

an engine speed detector configured to detect an engine speed of the engine;

an input shaft rotation speed detector configured to detect a rotation speed of the input shaft of the automatic transmission;

an output shaft rotation speed detector configured to detect a rotation speed of the output shaft of the automatic transmission; and an ECU programmed to estimate a deterioration ratio of the hydraulic oil by:

calculating a thermal deterioration ratio of the hydraulic oil during stoppage of the vehicle on the basis of an estimated value of a change in temperature of the hydraulic oil from stoppage of the vehicle to start of the vehicle, calculating a first current thermal deterioration ratio of the hydraulic oil on the basis of the temperature of the hydraulic oil detected by the oil temperature detector, adding the calculated first current thermal deterioration ratio to a previously calculated thermal deterioration ratio, and calculating the thermal deterioration ratio after the vehicle starts operating, calculating a second current thermal deterioration ratio of the hydraulic oil by summing the thermal deterioration ratio during stoppage of the vehicle and the thermal deterioration ratio after the vehicle starts operating, calculating a shear rotation speed of the hydraulic oil from the engine speed detected by the engine speed detector, the rotation speed of the input shaft detected by the input shaft rotation speed detector, and the rotation speed of the output shaft detected by the output shaft rotation speed detector, calculating the current mechanical deterioration ratio of the hydraulic oil on the basis of the calculated shear rotation speed, and adding the mechanical deterioration ratio to a previously calculated mechanical deterioration ratio, and comparing the second current thermal deterioration ratio with the mechanical deterioration ratio and selecting a larger one of the second current thermal deterioration ratio and the mechanical deterioration ratio as an estimated value of the deterioration ratio of the hydraulic oil.

7. The hydraulic oil deterioration ratio estimating apparatus according to claim 6, wherein the ECU is further programmed to estimate a deterioration ratio of the hydraulic oil by calculating the thermal deterioration ratio of the hydraulic oil from a time the vehicle stops operating to a time the vehicle starts operating on the basis of an estimated value of a change in temperature of the hydraulic oil from a time the vehicle previously stops operating to a time the vehicle starts operating and a thermal deterioration ratio per unit time of the hydraulic oil.

8. A hydraulic oil deterioration ratio estimating apparatus in a vehicle, comprising:
   a torque converter configured to transfer a drive force of an engine to an input shaft using hydraulic oil;
   an automatic transmission configured to change a rotation speed of the input shaft rotated by the drive force through hydraulic control using the hydraulic oil and configured to output a rotation to an output shaft;
   an oil temperature detector configured to detect a temperature of the hydraulic oil;
   an engine speed detector configured to detect an engine speed of the engine;
   an input shaft rotation speed detector configured to detect the rotation speed of the input shaft of the automatic transmission;
   an output shaft rotation speed detector configured to detect a rotation speed of the output shaft of the automatic transmission; and
   an ECU programmed to estimate a deterioration ratio of the hydraulic oil by:
      calculating a first thermal deterioration ratio of the hydraulic oil during stoppage of the vehicle based on an estimated value of a change in temperature of the hydraulic oil from the stoppage of the vehicle to start of the vehicle;
      calculating a first current thermal deterioration ratio of the hydraulic oil based on the temperature of the hydraulic oil detected by the oil temperature detector and adding the first current thermal deterioration ratio to an integrated value of the first current thermal deterioration ratio to calculate a second thermal deterioration ratio of the hydraulic oil after the vehicle starts operating;
      summing the first thermal deterioration ratio during the stoppage of the vehicle and the second thermal deterioration ratio after the vehicle starts operating to calculate a second current thermal deterioration ratio of the hydraulic oil;
      calculating a shear rotation speed of the hydraulic oil from the engine speed detected by the engine speed detector, the rotation speed of the input shaft detected by the input shaft rotation speed detector, and the rotation speed of the output shaft detected by the output shaft rotation speed detector, calculating a current mechanical deterioration ratio of the hydraulic oil based on the shear rotation speed, and adding the current mechanical deterioration ratio to an integrated value of the current mechanical deterioration ratio to calculate a mechanical deterioration ratio of the hydraulic oil; and
      comparing the second current thermal deterioration ratio with the mechanical deterioration ratio to select a larger one of the second current thermal deterioration ratio and the mechanical deterioration ratio as an estimated value of the deterioration ratio of the hydraulic oil.

9. The hydraulic oil deterioration ratio estimating apparatus according to claim 8, wherein the ECU is further programmed to calculate the first thermal deterioration ratio of the hydraulic oil from a first time the vehicle stops operating to a second time the vehicle starts operating based on an estimated value of a change in temperature of the hydraulic oil from the first time to the second time and a thermal deterioration ratio per unit time of the hydraulic oil.

* * * * *